Figure 2:
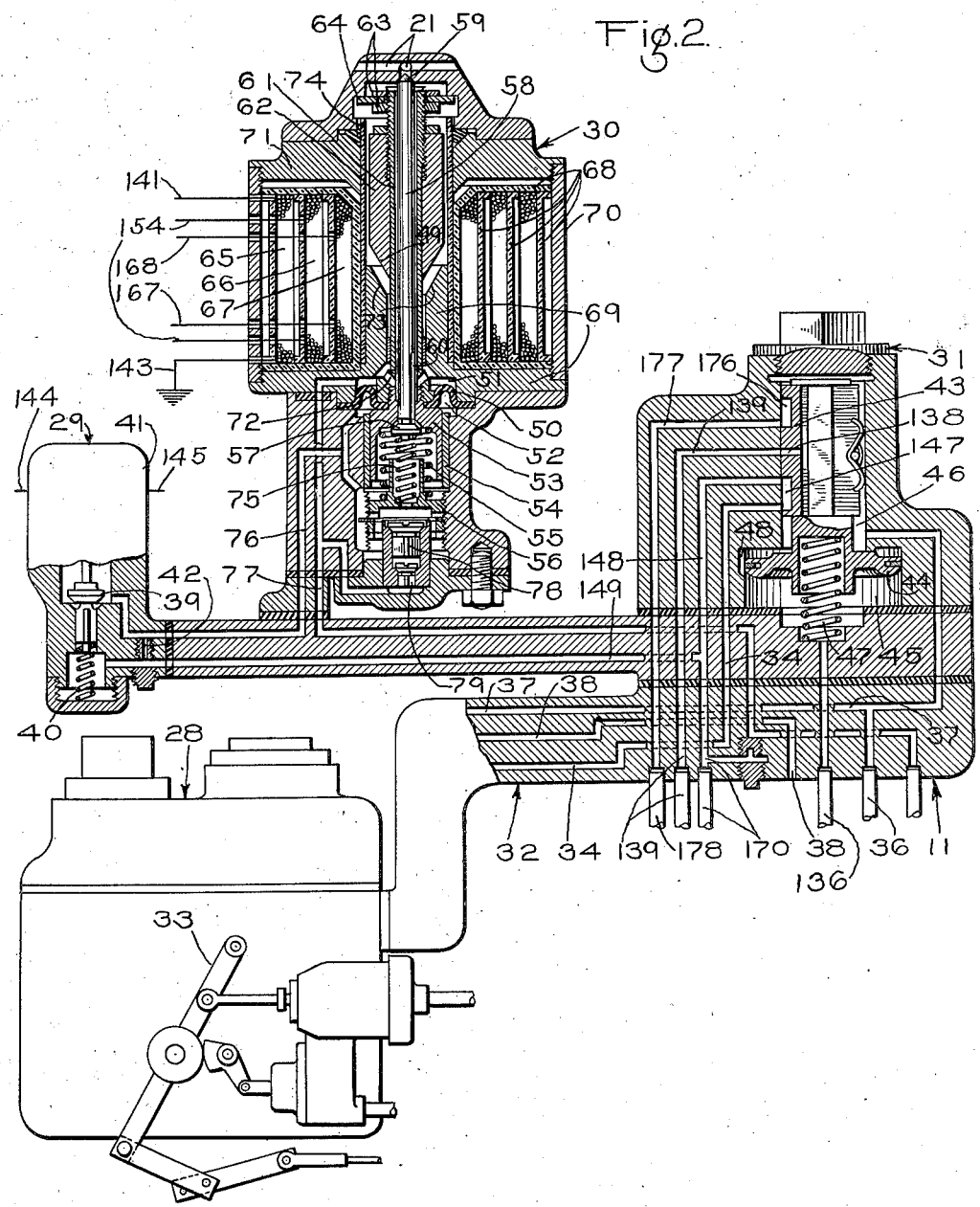

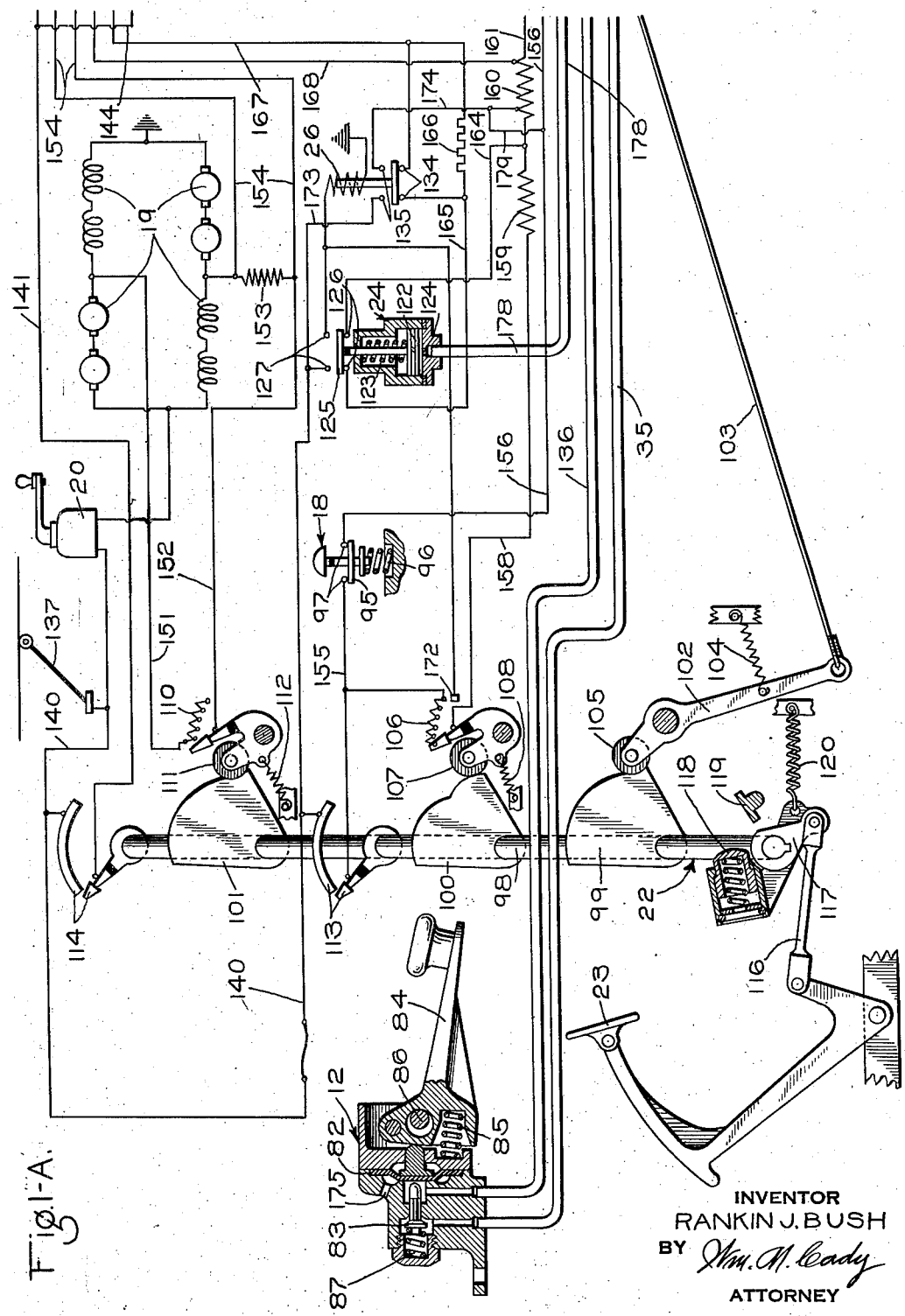

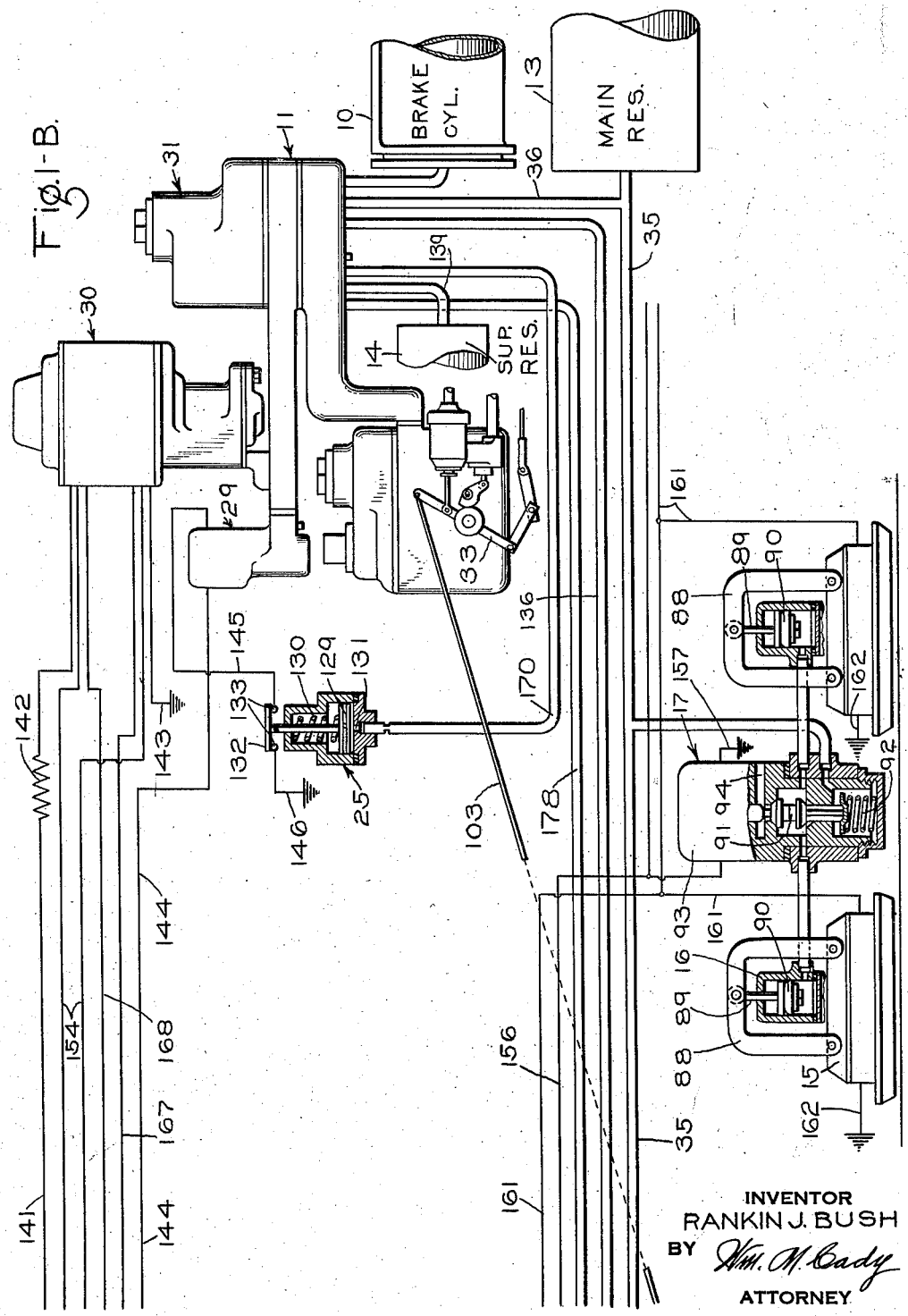

July 27, 1937.   R. J. BUSH   2,088,186
ELECTROMAGNETIC BRAKE
Filed May 12, 1936   3 Sheets-Sheet 3

INVENTOR
RANKIN J. BUSH
BY *Wm. M. Cady*
ATTORNEY

Patented July 27, 1937

2,088,186

UNITED STATES PATENT OFFICE 2,088,186

ELECTROMAGNETIC BRAKE

Rankin J. Bush, Jeannette, Pa., assignor to The Westinghouse Air Brake Company, Wilmerding, Pa., a corporation of Pennsylvania Application May 12, 1936, Serial No. 79,267

20 Claims. (Cl. 303—3)

This invention relates to electromagnetic brakes, and more particularly to interlocking means for vehicle brake systems employing both fluid pressure and electric brake devices.

Within recent years high speed railway vehicles have been placed in service provided with a brake equipment employing fluid pressure brakes, magnetic track brakes, and dynamic brakes. As is well known, the dynamic brakes comprise the vehicle driving motors disconnected from the source of power supply and reconnected in a dynamic braking circuit. The dynamic brakes are operated to produce a braking effect on the vehicle axles, whereas the magnetic track brakes produce a braking effect by operating on the track rails. The fluid pressure brakes comprise brake shoes operating on the treads of the vehicle wheels through action of brake cylinders.

When the vehicle is running at speeds above some low value, as for example five or six miles per hour, the dynamic brakes are capable of producing on the axles the maximum braking permitted by the adhesion between wheels and rails. If both the dynamic and fluid pressure brakes were applied to a maximum degree each, wheel sliding would undoubtedly result. It is therefore undesirable that both the fluid pressure and dynamic brakes be applied to a maximum degree each during normal applications of the brakes.

Moreover, in order to render modern vehicles quiet in operation inserts of rubber or similar material are usually provided between the wheel treads and the wheel spiders. In order to minimize possible damage to these inserts due to overheating it is desirable that braking on the wheel treads be kept to a minimum except in emergency cases. Therefore, in the brake equipments recently put into practice the fluid pressure brakes have been suppressed during normal brake application, through action of an electroresponsive valve device which interlocks the three types of brakes employed and functions in response to the degree of effectiveness of the track and dynamic brakes to suppress the degree of application of the fluid pressure brakes so long as the two electric brakes are producing the desired degree of braking.

In case one or both of the electric brakes should fail during an application, the electroresponsive valve device operates to increase the degree of application of the fluid pressure brakes so as to compensate for the loss in effectiveness of the electric brakes. In addition, at the end of the stop when the effectiveness of the dynamic brakes diminishes due to the decrease in vehicle speed, the electroresponsive valve device functions to increase the degree of application of the fluid pressure brakes in accordance with the decrease in effectiveness of the dynamic brakes.

The electroresponsive valve device forming the interlock between the two electric brake systems and the fluid pressure brake system operates upon the principle of balancing magnetic forces against fluid pressures. The magnetic forces established are intended to be proportional to the sum of the current supplied to the magnetic track brake devices and that existing in the dynamic brake circuit. Due to the inherent characteristics of the parts utilized in establishing these magnetic forces, the forces are not in direct relation to the current values, particularly at low current values. This is principally due to the characteristics of the magnetic circuit employed, wherein the relation of the magnetic flux established does not bear a constant relation to the current values establishing the flux. The magnetic force produced is, of course, proportional to the flux.

In order that the degree of application of the fluid pressure brake system shall be properly suppressed in accordance with the effectiveness of one or more electric brake systems, regardless of whether their effectiveness is of a low order or a high order, I contemplate providing a brake system of this character having an improved electroresponsive means for interlocking one or more electric brake systems and a fluid pressure brake system, whereby the degree of application of the fluid pressure brakes is governed more directly by the degree of effectiveness of the electric brake systems throughout their full range of effectiveness.

A further object of this invention is to provide a brake system of the aforementioned character in which an improved interlocking valve device is provided to more accurately control fluid pressures in accordance with variations of electric current, so as to control the degree of application of the fluid pressure brake system substantially inversely in accordance with the degree of application of the electric brake system.

A still further object of the invention is to provide an improved form of interlocking electroresponsive valve device which may be employed in conjunction with several types of brake systems employing both fluid pressure brakes and electric brakes, to provide a desired operating relation therebetween.

Further objects and advantages of the invention, dealing with specific constructions and arrangements of parts will be understood from the following description of an embodiment of my invention, wherein, Figs. 1A and 1B show in schematic and diagrammatic form an arrangement of parts comprising this embodiment.

Fig. 2 shows in diagrammatic form an improved electroresponsive valve device embodying my invention.

The brake equipment disclosed in the drawings is similar in many respects to that described and claimed in the pending application of Ellis E. Hewitt, Serial No. 26,394, filed June 13, 1935.

As shown, the fluid pressure brake system comprises one or more brake cylinders 10, for operating conventional wheel brakes, a control valve device 11, a safety valve device 12, a main reservoir 13, and a supplemental reservoir 14.

The magnetic track brake system comprises one or more track brake devices 15, a raising cylinder 16 associated with each track brake device, one or more magnet valve devices 17, and a foot switch device 18.

The dynamic brake system comprises the vehicle driving motors 19, which when operated as driving motors are supplied with power through a motor controller 20, and which when operated as brake devices are connected in a dynamic braking circuit as will be described later.

The common control mechanism for the three brake systems is indicated generally by the numeral 22, which mechanism is operated by a foot pedal 23.

Two switch devices 24 and 25, and an electric relay 26, are provided to perform interlocking functions as will be described later.

Considering first the fluid pressure brake system, the control valve device 11 comprises a brake valve section 28, a delay magnet valve section 29, an interlocking electroresponsive valve section 30, and an emergency or automatic valve section 31. These sections are secured to a common pipe bracket 32.

The brake valve section 28 is preferably of the self-lapping type, and may be identical with that disclosed in the aforementioned Hewitt application. Because this device may be of conventional design it is not shown nor described in detail. Briefly stated, this device functions in response to counterclockwise rotation of the lever 33 to supply fluid under pressure from the main reservoir 13 to a passage 34 leading to the automatic valve section 31. Communication from the main reservoir 13 to the brake valve section 28 is by way of main reservoir pipe 35, branch pipe 36 and passage 37.

The brake valve section is designed to establish fluid pressures in the passage 34 to a degree corresponding to the degree or extent of counterclockwise movement of the lever 33 and thereafter upon clockwise movement of the lever to release fluid under pressure from passage 34 to the atmosphere by way of exhaust passage 38.

The delay magnet valve section 29 is embodied in a casing containing a valve 39 which is urged toward unseated position by a spring 40 and toward seated position by an electromagnet 41 when energized. By-passing the valve 39 is a choke 42.

The automatic valve section 31 is embodied in a casing containing a slide valve 43 actuated by a piston 44. The piston 44 is subject on its lowermost side to fluid pressures in a chamber 45 and on its uppermost side to fluid pressures in slide valve chamber 46. When the pressures in these two chambers are substantially equal a spring 47 biases the piston 44 to its uppermost position, as illustrated. In this position of the piston a feed groove 48 connects the two chambers 45 and 46. The automatic valve section 31 functions to control communications that will hereinafter be more fully described.

The interlocking electroresponsive valve section 30 is embodied in a casing containing a movable abutment 50 subject on its upper side to fluid pressures in a chamber 51 and subject on its lower side to fluid pressures in a chamber 52. Secured to and carried by the movable abutment is a member 53 slidable in a bushing 54 secured in the casing. A spring 55 acts upon the member 53 to urge it upwardly. The lower end of this spring rests upon an adjustable member 56 screwed into a threaded portion of the casing.

The member 53 forms a seat for a valve 57 which has a stem 58 terminating in a release valve 59. The stem 58 is recessed at 60 so that when the valve 57 is unseated fluid under pressure may flow rapidly from chamber 52 past the unseated valve to the chamber 51.

The stem 58 is slidable in a non-magnetic tube or sleeve 61, of brass, copper, or the like, carried by a movable magnetic core 62, of iron, steel, or the like. The tube 61 has secured thereto as by nuts 63 a stop washer 64 for limiting the vertical movement of the core 62.

The movable core 62 is caused to move by magnetic flux established upon energization of one or more of three windings 65, 66 and 67. As shown, these three windings are concentrically arranged and insulated from each other and from the valve device casing by insulating members 68.

When one or more of these windings becomes energized a magnetic flux is established having a path including the movable core 62, a stationary core 69, a casing member 70, and an end member 71, all of these parts being of magnetic material. Flux thus established causes the movable core 62 to move toward the stationary core 69, as will be obvious. This downward movement of the core 62 carries with it the sleeve 61 and the end of the sleeve engages the upper surface of a securing nut 72 secured to the diaphragm 50.

The lower end of the movable core 62 terminates in a tapered face 49 matching a similar face 73 in the stationary core 69. As the movable core moves toward the stationary core the gap between the two faces 49 and 73 decreases and the magnetic attraction between the two cores increases. It is desired that the force of this attraction, for a given energization of the windings 65, 66 and 67, remain substantially constant. To accomplish this the faces 49 and 73 are tapered and spring 55 is provided, to counterbalance the variations in the force of magnetic attraction due to changes in the gap lengths.

As will be more fully described later, the winding 66 is supplied with current proportional to the degree of dynamic braking, while the winding 67 is supplied with current proportional to the degree of energization of the track brake devices. If the degree of current supplied to each of these two windings is relatively low the magnetic flux established may be so low as to not produce an appreciable force or effect on the movable core 62. This has been found to be the case in practice up to a predetermined degree of energization, after which the magnetic forces produced become more nearly proportional to the current values.

It is therefore desirable that a sufficient initial magnetic force be established, so that upon energization of the two windings 66 and 67 the magnetic forces produced on the movable core 62 shall bear a substantially straight-line relation to the degree of energization of these two windings. For this purpose the winding 65 has been provided, and during a brake application current is maintained supplied to this winding to a compensating degree sufficient to produce a predetermined initial magnetic force on the movable core, which degree is preferably such that the initial upward force produced by the spring 55 is very nearly balanced.

If the movable core 62 were permitted to move into contact with the stationary core 69, there would be a sharp increase in the magnetic effect on the movable core. In order that the magnetic effect on the core shall be proportional to the energization of the two windings 66 and 67 the movable core is prevented from engaging the stationary core, by prior engagement of the stop washer 64 with the upper edge of a tube 74. This tube is preferably made of some non-magnetic material, such for example as brass or bakelite.

As shown in Fig. 2, the parts of the valve section 30 are in release position, where a light spring 75 holds the release valve 59 seated, while valve 57 is held unseated by action of spring 55. When fluid under pressure is supplied to the chamber 52 it flows past this unseated valve to chamber 51. If only the winding 65 is energized, and to a compensating degree, then this flow will continue until the pressure in chamber 51 equals or slightly exceeds the pressure in chamber 52, whereupon the diaphragm 50 will be actuated downwardly to seat valve 57.

However, if one or both of windings 66 and 67 are energized, then the downward force acting on diaphragm 50 from above is that due to both the fluid pressure in chamber 51 and to the downward force exerted by the movable core 62. Therefore, the diaphragm 50 will be moved downwardly to seat the valve 57 at a fluid pressure in the chamber 51 substantially inversely proportional to the combined degree of energization of the two windings 66 and 67.

If the two windings are energized each to a full degree, then it is intended that the valve 57 shall be held seated and no pressure of consequence established in the chamber 51. If when the two windings are energized to a maximum degree each the degree of energization is subsequently reduced, as due to a decrease in the current supplied to the magnetic track brake devices, or due to a decrease of current in the dynamic braking circuit, and maximum pressure exists in chamber 52, then it will be obvious that the valve 57 will be unseated to supply fluid under pressure to chamber 51 to compensate for the decreasing magnetic force acting on the upper side of the diaphragm 50.

If when a given fluid pressure has been established in the chamber 51 the degree of energization of one or both of windings 66 and 67 should increase, then the diaphragm 50 will be actuated downwardly to unseat the release valve 59. Unseating of this valve will release fluid under pressure from the chamber 51, past the stem 58 and through port 21 to the atmosphere. This release will take place until the fluid pressure in chamber 51 diminishes sufficiently for that in chamber 52 to seat the release valve 59.

Fluid under pressure is supplied to the chamber 52 by way of a passage 76, and flows from the chamber 51 by way of another passage 77. In order that fluid under pressure may be released from chamber 51 upon a release of fluid under pressure from chamber 52, regardless of the position of valve 57, there are provided in the valve device two check valves 78 and 79. As will be seen from the arrangement shown, upon a decrease of pressure in the chamber 52 the overbalancing pressure in chamber 51 will unseat the check valve 79 and then the check valve 78 to permit flow of fluid from chamber 51 and passage 77 to chamber 52 and passage 76.

The safety valve device 12 is embodied in a casing containing a diaphragm release valve 82 and a supply valve 83. The diaphragm valve 82 is held in a seated position and the supply valve 83 in an unseated position by pressure manually applied to a hand lever 84. Upon release of this pressure a spring 85 returns the hand lever 84 to an upper position, as limited by a pin 86, whereupon another spring 87 seats the supply valve 83 and unseats the diaphragm valve 82.

The magnetic track brake devices 15 may be of conventional design, and are provided with links or yokes 88 secured to a stem 89 of a piston 90 in one of the raising cylinders 16. When fluid under pressure is supplied to the raising cylinder 16, the piston 90 therein is actuated upwardly to hold the track brake device suspended above a track rail. When fluid under pressure is released from the raising cylinder the track brake device drops to the rail due to gravity effect.

The supply of fluid under pressure to and its release from the raising cylinders is controlled by the magnet valve device 17. This valve device is embodied in a casing containing a double beat valve 91 urged toward an upper seated position by a spring 92 and toward a lower seated position by an electromagnet 93 when energized. As shown, in upper seated position the double beat valve opens a communication between the main reservoir pipe 35 and the two raising cylinders 16, and when in lower seated position closes this communication and vents the two raising cylinders to the atmosphere by way of exhaust port 94.

The foot switch device 18 essentially comprises a depressible button having secured thereto and insulated therefrom a bridging contact 95, adapted when urged upwardly by a spring 96 to bridge two stationary contacts 97.

The common control mechanism designated at 22 comprises essentially a common shaft 98 having rigidly disposed thereon and rotatable therewith three cams 99, 100 and 101. The cam 99 operates a lever 102 which in turn through a cable 103 operates the lever 33 on the brake valve section 28 in the control valve device 11. A spring 104 holds a roller 105 in one end of the lever 102 in engagement with the cam 99.

The cam 100 operates a rheostat 106 which controls the supply of current to the track brake devices 15. The rheostat 106 has an arm operated by a roller 107 held in engagement with the cam 100 by spring 108.

The cam 101 operates a second rheostat 110 which controls the degree of current established in the dynamic brake circuit. This rheostat has an arm operated by a roller 111 held in engagement with the cam 101 by spring 112.

Also secured to and operated with the shaft 98 are contact arms of two switch devices 113 and 114. As shown, when the shaft 98 is rotated through a small angle these switch devices close their contacts, to establish circuits which will hereinafter be more fully described.

The configurations of the three cams 99, 100 and 101 may be designed to vary the degree of potential application of the three brake systems in any desired manner. One preferred sequence, as illustrated, comprises operating the brake valve section 28 and the dynamic brake rheostat 110 only for a first rotational movement of shaft 98, and for then operating the magnetic track brake rheostat 106 together with the brake valve section and the dynamic rheostat. That is to say, the brake valve section and the dynamic brake rheostat are concurrently operated to increase the degree of application of the fluid pressure and dynamic brakes, according to rotation of shaft 98, while the track brake rheostat is not operated to increase the degree of application of the track brakes until a predetermined rotation of shaft 98 has first taken place.

The foot pedal 23 is employed to rotate shaft 98, through a link 116 and an arm 117 secured to the shaft 98. Also carried by and rotatable with the shaft 98 is a spring stop 118 which engages a fixed stop 119 when the shaft approaches the limit of its rotational movement. Due to the added resistance offered by the spring stop the operator is warned that he is approaching the limit of rotation of the shaft, and hence the full degree of application of the brakes. A spring 120 normally biases the shaft 98, and consequently foot pedal 23, to their release position.

The switch device 24 is embodied in a casing containing a piston 122 subject on its uppermost side to pressure of a spring 123 and on its lowermost side to fluid under pressure supplied to a chamber 124. In the lowermost position of the piston 122 a bridging contact 125 bridges stationary contacts 126, while in the uppermost position of the piston the bridging contact bridges stationary contacts 127.

The switch device 25 is similar to switch device 24, being embodied in a casing containing a piston 129 subject on its upper side to pressure of spring 130 and on its lowermost side to fluid under pressure supplied to a chamber 131. In the lowermost position of the piston 129 a bridging contact 132 bridges two stationary contacts 133, while in the uppermost position of the piston this engagement is broken.

The electric relay 26 is adapted when deenergized to close contacts 134 and when energized to open these contacts and close another set of contacts 135.

The operation of this embodiment of my invention is as follows:

Running condition

When the vehicle is running under power, or coasting, the operator removes his foot from the foot pedal 23, so that spring 120 may maintain the shaft 98 in its release position. At the same time, the operator maintains pressure manually applied to the hand lever 84 of the safety valve device 12. The safety valve device then establishes communication between the main reservoir pipe 35 and a normally charged pipe 136, which for convenience may be referred to as a safety control pipe. This pipe is then charged with fluid at main reservoir pressure.

Fluid under pressure in the safety control pipe flows to the piston chamber 45 in the automatic valve section 31 of the control valve device. Piston 44 is therefore held in its uppermost position and fluid flowing past the feed groove 48 to the slide valve chamber 46, flows through a slide valve port 138 and pipe and passage 139 to supplemental reservoir 14, thus charging this reservoir.

In release position of foot pedal 23 the magnet valve device 17 is deenergized, so that fluid under pressure is supplied from the main reservoir pipe 35 to the raising cylinders 16, thus holding the track brake devices 15 suspended above the track rail.

The other parts of the brake equipment will be in the positions as shown, so that the operator by manipulation of the power controller 20 may supply power to the driving motor 19 from a trolley 137.

Service application

When it is desired to effect a service application of the brakes, the foot pedal 23 is depressed to a degree according to the desired degree of application of the brakes. This rotates the shaft 98, and consequently the cams 99, 100 and 101 secured thereto. Cam 99 actuates brake valve device 28 to supply fluid under pressure to the passage 34.

As soon as the shaft 98 has rotated through a small angle, the two switch devices 113 and 114 are closed. Closing of the switch device 114 supplies current to the exciting winding 65 in the electroresponsive section 30 of the control valve device, and also energizes electromagnet 41 in the delay magnet section 29.

The circuit for the exciting winding 65 includes beginning at trolley 137, conductor 140, switch device 114, conductor 141, resistance 142, the exciting winding 65, and ground connection 143. The circuit for the delay electromagnet 41 includes the same circuit up to and including conductor 141, and from there on includes conductor 144, the delay electromagnet 41, conductor 145, contacts 132 and 133 of switch device 25, and ground connection 146.

Energization of the exciting winding 65 establishes sufficient magnetic force to nearly counterbalance the effect of spring 55, and to overcome the lag initially existing due to the characteristics of the magnetic circuit of the electroresponsive valve section 30.

Energization of the delay electromagnet 41 causes seating of the valve 39, to limit the flow of fluid through this section to the capacity of the choke 42. From passage 34 fluid under pressure flows through slide valve cavity 147, passages 148 and 149, choke 42, and passage 76 to the chamber 52 below diaphragm 58. The choke 42 restricts the rate of flow and consequently the fluid pressure established in chamber 52 will build up at a very slow rate.

In the meantime, cam 101 will have actuated the rheostat 110 to connect the vehicle's motors 19 in a dynamic braking circuit including conductor 151, the rheostat 110, conductor 152, and resistance 153. This will cause the motors to produce a dynamic braking effect, the degree of which is determined by the amount of resistance in rheostat 110 connected in the circuit. Connected across the resistance 153 is the winding 66 in the electroresponsive section 30. Conductors 154 provide this connection. Therefore, winding 66 will be energized according to the current in the dynamic braking circuit.

Closing of the switch device 113 energizes the magnet valve device 17 and also supplies current to the track brake devices 15. The circuit to the magnet valve device 17 is, beginning at trolley 137, conductor 140, switch device 113, conductor 155, contacts 95 and 97 of the foot switch 18, conductor 156, the electromagnet 93, and ground connection 157. The circuit to the track brake devices includes beginning with conductor 155, rheostat 106, conductor 158, resistances 159 and 160, conductor 161, the track brake devices 15, and ground connections 162.

Energization of the magnet valve device 17 actuates the double beat valve 91 to lower seated position to vent the raising cylinders 16, and thus permit the track brake devices to drop to engagement with the track rails due to gravity effect. Energization of the track brake devices produces a magnetic attraction to the rail and thereby a braking effect on the track rail.

The winding 67 in the interlocking valve section 30 is connected across the resistance 160 in the track brake energizing circuit, through a circuit including, beginning at the resistance 160, conductor 164, contacts 125 and 126 of switch device 24, conductor 165, contacts 134 of relay 26, conductor 167, the winding 67, and conductor 168.

Thus it will be seen that upon initiating an application of the brakes the delay electromagnet 41 will be energized, windings 66 and 67 in the interlocking valve section 30 will be energized, respectively, according to the degree of effectiveness of the dynamic brakes and the track brakes, and winding 65 will be energized to a substantially constant degree.

Fluid under pressure supplied to the chamber 52 in the interlocking valve section 30 also flows by way of pipe and passage 170 to chamber 131 in the switch device 25. When the pressure of this fluid reaches a predetermined value, piston 129 will be actuated upwardly to open contacts 133. This will deenergize the delay magnet 41 and permit fluid to flow to the chamber 52 at the normal rate.

The purpose of the delay magnet valve section 29 is to retard the flow of fluid until the windings 66 and 67 in the interlocking valve section will have had time to become energized according to the effectiveness of the two electric brake systems.

Thereafter, when fluid under pressure is supplied to the chamber 52 according to operation of the brake valve section 28, the upward pressure exerted on the diaphragm 50 is opposed by the downward magnetic force due to energization of the three windings 65, 66 and 67. Therefore, if the dynamic and magnetic track brakes are producing the desired braking effect, valve 57 will be held seated and fluid under pressure will not be supplied to the brake cylinder 10 to any appreciable degree.

If the foot pedal 23 is depressed to the end of the application zone, the arm of track brake rheostat 106 will engage a contact 172 and thus energize electric relay 26. This relay will then open its contacts 134 and close its contacts 135. Opening of contacts 134 connects the resistance 166 in the circuit to the windings 67 to cause a smoother operation of the interlocking valve section when the energization is increased, as has been determined from actual tests.

Closing of relay contacts 135 forms a by-pass circuit from the trolley to the track brake devices 15 by way of conductor 173, contacts 135, and conductor 174, to shunt out of the circuit the rheostat 106 and the resistance 159. The track brake devices will thus be energized to the maximum degree for the extreme downward position of the foot pedal 23. Similarly, the dynamic brakes will be also effective to their maximum degree.

If there were no change in the effectiveness of the two electric brake systems, then the vehicle would be brought to a stop with the fluid pressure brake system wholly suppressed, or at most applied to only a relatively low degree. However, as the speed of the vehicle diminishes the effectiveness of the dynamic brake system will at some very low speed begin to diminish, and as a consequence the downward magnetic force acting on the diaphragm 50 will diminish. The diaphragm will then be actuated upwardly to increase the degree of application of the fluid pressure brake system to compensate for the decrease in effectiveness of the dynamic brake system. The vehicle will then be brought to a stop with an increasing degree of application of the fluid pressure brake system.

If the exciting winding 65 were not supplied and maintained energized to a predetermined degree, then when the current in each of the windings 56 and 67 diminishes to a relatively low degree, the magnetic force produced on the movable core 62 would decrease faster than the decrease in current in the two windings, so that the fluid pressure brakes would be applied to a much higher degree than desired or necessary, as determined by the position of the foot pedal 23. By maintaining the winding 65 energized to a low degree, the increase in the degree of application of the fluid pressure brakes is made to correspond substantially to the decrease in degree of effectiveness of the two electric brake systems. The fluid pressure brake system is then operated to supply only the deficiency in braking effect necessary to cause that produced by all three brake systems to correspond to the foot pedal position. Because the interlocking valve section maintains a direct relationship between degree of application of the fluid pressure brakes and degree of application of the electric brakes, a severe application of the fluid pressure brakes is avoided at the end of the stop.

It is to be here understood that for any given position of the foot pedal 32 the potential effectiveness of the fluid pressure brake system is equivalent to the potential effectiveness of the two electric brake systems combined. Thus should both of the electric brake systems fail during an application the fluid pressure brake system would immediately be applied to a degree equivalent to that to which the two electric brake systems would be applied, that is according to foot pedal position.

To effect a release of the brakes following a service application, pressure applied to the foot pedal 23 is released, whereupon spring 120 will return shaft 98 to its release position. As will be obvious, all three brake systems will then be released.

Emergency application

When it is desired to effect an emergency application of the brakes this may be accomplished by releasing pressure manually applied to the hand lever 84 of the safety valve device 12. The resulting upward movement of this handle then seats the valve 83 and unseats the diaphragm valve 82, to vent the safety control pipe 136 to the atmosphere by way of exhaust port 175.

Venting of this pipe causes a reduction of pressure in the piston chamber 45 of the automatic valve section 31 in the control valve device, and the over-balancing pressure in the slide valve chamber 46 actuates piston 44 downwardly into engagement with the gasket shown. This moves the slide valve 43 to a position where port 138 registers with passage 148, while cavity 176 connects passage 139 to passage 177. Passage 34 is at this time blanked.

When slide valve port 138 registers with passage 148 fluid under pressure is supplied from the slide valve chamber 46, and consequently main reservoir pipe 35, to the passage 148 leading to the delay valve section 29 and interlocking valve section 30. When passage 139 is connected to passage 177 fluid under pressure is supplied from the supplemental reservoir 14 to pipe 178 leading to chamber 124 in switch device 24. This pipe may also lead to a sanding device (not shown) as in conventional practice.

The switch device 24 will have piston 122 therein actuated upwardly to open contacts 126 and close contacts 127. Opening of contacts 126 disconnects the winding 67 in the interlocking valve section 30 from the track brake circuit and thus prevents energization of this winding due to current supplied to the track brake devices.

Closing of contacts 127 energizes relay 26, and it thereupon opens contacts 134 and closes contacts 135. Closing of contacts 135 effects maximum energization of the track brake devices 15, as before described. At the same time the magnet valve device 17 is energized through conductor 179 so as to permit the track brake devices to drop to engagement with the rail.

As will be obvious, venting of the safety control pipe 136 does not effect the operation of the dynamic brake system, and since the three windings in the interlocking valve section 30 are not energized, it follows that the fluid pressure brake system will be applied to a maximum degree, as well as the magnetic track brake system. Thus during an emergency application of the brakes only the magnetic track brake system and the fluid pressure brake system are cut into operation.

It will, of course, be obvious that an emergency application will result if the safety control pipe 136 should become ruptured through accidental means.

To effect a release of the brakes following an emergency application effected from the safety control valve device 12, pressure is again manually applied to the hand lever 84 to recharge the safety control pipe. This will cause piston 44 in the automatic valve section 31 to return to its uppermost position shown, whereupon passage 148 will be reconnected by cavity 147 to the passage 34 leading to the brake valve section 28. Fluid under pressure will then be released to the atmosphere through the brake valve section, and thus cause a release of both the fluid pressure brakes and the magnetic track brakes.

If at any time when effecting an application of the brakes below a maximum, as when switching about terminal yards, it is desired to render the magnetic track brake system ineffective, the operator may apply pressure to the button of the foot switch device 18, and thus open the circuit to the magnet valve device 17. This will prevent the track brake devices dropping to engagement with the track rail, although they may be energized through operation of the rheostat 106.

While I have illustrated and described my invention with particular reference to a specific type of brake system, it is to be understood that I do not wish to be limited either to this application of the invention, or to the specific details or arrangements of the parts shown, nor otherwise than by the spirit and scope of the appended claims.

Having now described my invention, what I claim as new and desire to secure by Letters Patent, is:

1. In a vehicle brake equipment comprising a fluid pressure brake system and an electric brake system, in combination, a circuit in which current flows when the electric brake system is operated to produce a braking effect, electroresponsive means responsive to the current in said circuit for controlling the degree of braking effect produced by operation of said fluid pressure brake system, and means for independently supplying current to said electroresponsive means to facilitate the operation thereof.

2. In a vehicle brake equipment, in combination, a fluid pressure brake system, an electric brake system, electroresponsive means interconnecting said two brake systems and operating to control the effectiveness of one of said two brake systems according to the effectiveness of the other of said brake systems, and means for independently energizing said electroresponsive means to render it more effective in controlling the one brake system.

3. In a vehicle brake system, in combination, a brake cylinder, an electric brake system, electroresponsive means controlling a communication through which fluid under pressure is supplied to effect a supply of fluid under pressure to the brake cylinder, means for energizing said electroresponsive means according to the degree of braking effect produced by operation of the electric brake system, and means for energizing said electroresponsive means independently of operation of said electric brake system to increase the effectiveness thereof.

4. In a vehicle brake system, in combination, a brake cylinder, an electric brake device, a circuit in which current flows according to the degree of effectiveness of said electric brake device, an electroresponsive valve means for controlling a communication through which fluid under pressure is supplied to effect a supply of fluid under pressure to the brake cylinder and operated to control the degree of brake cylinder pressure according to the degree of current in said circuit, and means for separating supplying current to said electroresponsive valve means to alter the relation between brake cylinder pressure and the degree of effectiveness of said electric brake device.

5. In a vehicle brake system, in combination, fluid pressure brake means, magnetic track brake means, dynamic brake means, electroresponsive means interlocking said three brake means and being responsive to operation of said magnetic track brake means and said dynamic brake means to control the degree of braking effect produced by operation of said fluid pressure brake means, and means operating upon said electroresponsive means to cause the degree of braking effect produced by operation of said fluid pressure brake means to be controlled in a substantially inverse relation to the combined effectiveness of said magnetic track brake means and said dynamic brake means throughout their entire range of effectiveness.

6. In a vehicle brake system, in combination, a brake cylinder, a magnetic track brake device having a winding to which current is supplied to produce a track braking effect, a dynamic brake system having a circuit in which current flows according to the degree of dynamic braking produced, an electroresponsive valve mechanism having a plurality of independent windings and being operable to control brake cylinder pressure according to the degree of energization of said windings, means for energizing one of said windings according to the degree of current supplied to said magnetic track brake device winding, means for energizing another of said windings according to the degree of current in said dynamic brake circuit, and means for energizing still another of said windings to a substantially constant degree.

7. In a vehicle brake system, in combination, fluid pressure brake means, electric brake means, an electroresponsive valve device for controlling a communication through which fluid under pressure is supplied to effect the operation of said fluid pressure brake means to apply the brakes, said electroresponsive valve device having a first winding adapted to be energized according to the degree of effectiveness of the electric brake means and having a second winding adapted to be energized to a substantially constant degree to cause the valve device to control the pressure of fluid supplied through said communication more nearly according to the degree of effectiveness of said electric brake means, and means operable upon initiating an application of the brakes for supplying a substantially constant current to said second winding.

8. In a vehicle brake system, in combination, a brake cylinder, a magnetic track brake device, dynamic brake means, means operable upon initiating an application of the brakes for establishing a communication through which fluid under pressure is supplied to effect a supply of fluid under pressure to said brake cylinder, and for supplying current to said track brake device and for connecting said dynamic brake means in a dynamic braking circuit, an electroresponsive valve device having three windings and being operable to control the pressure of fluid supplied through said communication according to the energization of said three windings, means for energizing one of said windings according to the degree of current supplied to said track brake device, means for energizing another of said windings according to the degree of current in said dynamic braking circuit, and means for energizing the third of said windings to a predetermined degree to increase the efficiency of operation of said valve device.

9. In a vehicle brake system, in combination, vehicle driving motors adapted to be connected in a dynamic braking circuit to produce a braking effect, magnetic track brake means adapted to have current supplied thereto to produce a different braking effect, a brake cylinder adapted to have fluid under pressure supplied thereto to operate a brake to produce still another braking effect, an electroresponsive valve device having three windings and being operable to control brake cylinder pressure according to the variation of current in two of said windings, means for supplying current to each of said two windings respectively according to current supplied to said track brake means and current in said dynamic braking circuit, and means operable upon initiating an application of the brakes for supplying a substantially constant current to the third of said windings to increase the efficiency of operation of said valve device.

10. In a vehicle brake equipment, in combination, a brake cylinder, a track brake device, an electrodynamic brake device, means for controlling the operation of each of said brake devices, a valve device for controlling a communication through which fluid under pressure is supplied to effect a supply of fluid under pressure to said brake cylinder, said valve device having a plurality of windings and a diaphragm subject on one side to pressure of said fluid supply and on the other side to the magnetic force produced by energization of said windings, means for energizing one of said windings according to the degree of current flowing in said track brake device, means for energizing another of said windings according to the degree of current flowing in said electrodynamic brake device, and means for energizing a third one of said windings sufficiently to increase the sensitivity of said valve device to low currents supplied to each of said other windings.

11. In a vehicle brake equipment, in combination, a brake cylinder, a track brake device, means for establishing a communication through which fluid under pressure is supplied to effect a supply of fluid under pressure to said brake cylinder, means for supplying current to said track brake device, a valve device for controlling said communication through which fluid under pressure is supplied, said valve device having two windings and a diaphragm subject one one side to pressure of said fluid supply and on the other side to the magnetic force produced by energization of said windings, means for energizing one of said two windings according to the current supplied to said track brake device, and means for energizing the other of said two windings to a substantially constant degree, whereby said valve device may control brake cylinder pressure inversely according to variations of current in the windings energized according to current supplied to said track brake device.

12. In a vehicle brake equipment, in combination, a brake cylinder, an electrodynamic brake device adapted to be connected in a dynamic braking circuit to produce a braking effect, means for establishing a communication through which fluid under pressure is supplied to effect a supply of fluid under pressure to said brake cylinder, a valve device for controlling said communication, said valve device having two windings and a diaphragm subject on one side to pressure of said fluid supply and on the other side to the magnetic force produced by energization of said two windings, means for energizing one of said windings according to the current in said dynamic brake circuit, and means for energizing the other of said two windings to a predetermined constant degree.

13. In a vehicle brake equipment, in combination, a brake cylinder, electric brake means, a valve device for controlling a communication through which fluid under pressure is supplied to effect a supply of fluid under pressure to said brake cylinder, said valve device having a plurality of windings and being adapted to control brake cylinder pressure according to the energization of said windings, means for energizing one of said windings to a predetermined constant degree, means for energizing the other of said windings according to the degree of effectiveness of said electric brake means when in operation, and means operated upon a decrease in fluid pressure for deenergizing said last mentioned winding.

14. In a vehicle brake system, in combination, fluid pressure brake means, electric brake means, common control means operable from a release position to various application positions to effect the operation of said two brake means to apply the brakes, electroresponsive means for controlling the operation of said fluid pressure brake means according to the degree of effectiveness of said electric brake means, said electroresponsive means having at least one winding energized with current corresponding to the effectiveness of said electric brake means and another winding energized to a substantially constant degree to increase the efficiency of operation of said electroresponsive means, and means for energizing said last mentioned winding when said common control means is operated to initiate an application of the brakes.

15. In a valve mechanism, in combination, a movable abutment subject on one side to both variable fluid pressures and the constant pressure of a spring, and subject on the other side to both variable fluid pressures and variable pressures produced by an electromagnet, a valve seat carried by said abutment, and a valve movable relative to said abutment and co-acting with said seat to control a communication through which fluid under pressure is supplied to effect an application of the brakes.

16. In a valve mechanism, in combination, a movable valve seat, a movable valve co-acting with said seat to control a communication from a first chamber to a second chamber, means responsive to fluid under pressure supplied to said first chamber for biasing said valve seat relative to said valve to maintain a communication between said first and second chambers, electromagnetic means for opposing the biasing of said movable seat, and a check valve operable to establish a communication to permit flow of fluid under pressure from said second chamber to said first chamber when said movable valve is sealed but preventing flow in the opposite direction.

17. In a valve mechanism, in combination, a movable valve seat, a valve co-acting with said seat and movable relative thereto for controlling communication between a first chamber and a second chamber, means establishing a by-pass communication between said two chambers, and two check valves in said by-pass communication operable upon a preponderance of pressure in said second chamber to open said by-pass communication to permit flow of fluid under pressure from said second chamber to said first chamber, but operable to prevent flow in the opposite direction.

18. In a valve mechanism, in combination, a movable valve seat, a valve co-acting with said seat and movable relative thereto, a diaphragm for moving said seat and being operable upon supply of fluid under pressure to a chamber to one side of said diaphragm to bias said seat to open a communication through which fluid under pressure is supplied to effect an application of the brakes, said diaphragm being subject on its other side to the pressure of fluid supplied through said communication, and electromagnetic means for opposing biasing of said seat, and operable upon energization thereof, to close said communication when the pressure of fluid supplied therethrough corresponds to the differential of pressure between that of fluid in said chamber and that produced by energization thereof.

19. In a valve mechanism, in combination, a plurality of windings, a movable abutment subject on one side to fluid pressures in a first chamber and pressure exerted by a spring, and subject on the other side to fluid pressures in a second chamber and magnetic forces produced by energization of said plurality of windings, a valve seat movable with said abutment, a valve co-acting with said seat to control a communication through which fluid under pressure is supplied to and released from a brake controlling device, means establishing a by-pass communication around said valve between said first and second chambers, and two check valves in said by-pass communication operable to permit flow of fluid from said second chamber to said first chamber and operable to prevent flow in the reverse direction.

20. In a valve mechanism, in combination, an electromagnet having a movable core, a release valve and a supply valve at opposite ends of said core, a stem interconnecting said two valves and extending through but movable relative to said core, and a movable abutment subject to fluid pressures and magnetic forces produced in said core for controlling operation of said two valves.

RANKIN J. BUSH.